United States Patent
Lim et al.

(10) Patent No.: US 8,305,673 B2
(45) Date of Patent: Nov. 6, 2012

(54) LIGHT SCANNING UNIT

(75) Inventors: Heon-Hee Lim, Suwon-si (KR); Jong-Wuk Ku, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 217 days.

(21) Appl. No.: 12/650,754

(22) Filed: Dec. 31, 2009

(65) Prior Publication Data

US 2010/0165434 A1  Jul. 1, 2010

(30) Foreign Application Priority Data

Dec. 31, 2008 (KR) .................. 10-2008-0138723
Jun. 3, 2009 (KR) .................. 10-2009-0049095
Aug. 28, 2009 (KR) .................. 10-2009-0080719

(51) Int. Cl.
*G02B 26/08* (2006.01)

(52) U.S. Cl. .................................. 359/205.1

(58) Field of Classification Search ..... 359/205.1–207.1
See application file for complete search history.

(56) References Cited

U.S. PATENT DOCUMENTS

| 5,646,767 | A | 7/1997 | Iima |
| 2006/0050348 | A1 | 3/2006 | Shimomura |
| 2008/0151326 | A1* | 6/2008 | Shimomura ................. 358/474 |

FOREIGN PATENT DOCUMENTS

| EP | 1621917 | 2/2006 |
| JP | 07-230051 | 8/1995 |
| JP | 08-029712 | 2/1996 |
| JP | 09-185002 | 7/1997 |

OTHER PUBLICATIONS

European Search Report issued Jun. 7, 2010 in EP Application No. 09180989.7.

* cited by examiner

*Primary Examiner* — Euncha Cherry
(74) *Attorney, Agent, or Firm* — Stanzione & Kim, LLP

(57) ABSTRACT

Disclosed is a light scanning unit that includes an imaging optical system disposed between a beam deflector and a surface to be scanned. The imaging optical system includes two adjacent imaging optical devices that are inclined with respect to the light path. The inclination directions of the two adjacent imaging optical devices may be determined according to the number of reflection units that are disposed on the light path between the two adjacent imaging optical devices. The disclosed light scanning unit of the above configuration may advantageously exhibit reduced ghost images, reduced bowing of the scan line, improved beam diameter uniformity, and/or improved color registration.

19 Claims, 10 Drawing Sheets

LIGHT SCANNING UNIT

CROSS-REFERENCE TO RELATED PATENT APPLICATION

This application claims the benefit of Korean Patent Application No. 10-2008-0138723, filed on Dec. 31, 2008, Korean Patent Application No. 10-2009-0049095, filed on Jun. 3, 2009, and of Korean Patent Application No. 10-2009-0080719, filed on Aug. 28, 2009, in the Korean Intellectual Property Office, the disclosures of which in their entirety are incorporated herein by reference.

TECHNICAL FIELD

The present disclosure relates generally to a light scanning unit, and more particularly, to a light scanning unit including a plurality of image forming optical devices.

BACKGROUND OF RELATED ART

Broadly speaking, an electrophotographic image forming apparatus forms an image on a printing medium by performing sequentially the formation of an electrostatic latent image by scanning a light beam from a light scanning unit onto a photosensitive drum, the generation of a developed image by developing the electrostatic latent image using a developing agent such as a toner, the transfer of the developed image onto the printing medium, and the fixing of the transferred developed image on the printing medium.

A light scanning unit used in such an electrophotographic image forming apparatus deflection-scans a light beam by using a light deflector, e.g. a rotating polygonal mirror. In order for the deflected light beam to form an image on a surface being scanned, an imaging optical system is disposed between the light deflector and the photosensitive drum, A scan lens used in such imaging optical system is formed of either glass or plastic, and conventionally, in order to prevent the partial reflection of the light beam incident on the scan lens, has an anti-reflection coating on the incident surface of the scan lens. However, the anti-reflection coating may increase manufacturing costs and/or may adversely impact the light efficiency.

SUMMARY OF DISCLOSURE

According to an aspect of the present disclosure, there is provided a light scanning unit that may comprise a light source configured to emit a light beam, a light deflector configured to deflect the light beam and an imaging optical system. The imaging optical system may be configured to form an image of the deflected light beam on a surface to be scanned, and may comprise at least two imaging optical devices that are disposed on the light path between the light deflector and the surface to be scanned. two adjacent imaging optical devices from among the at least two imaging optical devices may be inclined with respect to the light path. The inclination directions of the two adjacent imaging optical devices may be determined based at least in part on the number of reflection units that are disposed on the light path between the two adjacent imaging optical devices.

When an odd number of the reflection units are disposed on the light path between the two adjacent imaging optical devices, the two adjacent imaging optical devices may be inclined in directions opposite to each other.

When no reflection unit or an even number of the reflection units are disposed on the light path between the two adjacent imaging optical devices, the two adjacent imaging optical devices may be inclined in the same direction.

The two adjacent imaging optical devices may be rotated either clockwise or counterclockwise around an axis extending along a main scanning direction.

The two adjacent imaging optical devices may be rotated by an angle that is less than or equal to 4 degrees.

The reflection units may comprise either a reflective mirror or a total reflection prism.

The light scanning unit may further comprise at least one additional light source each configured to emit another light beam. The imaging optical system may further comprise at least two imaging optical devices arranged on each light path of the light beams deflected by the light deflector. Imaging optical devices that are closest to the light deflector in each light path of the light beams may be inclined with respect to the respective light path.

Two light beams reflected by the light deflector may be deflection-scanned in opposite directions. The imaging optical devices, which are respectively disposed on the light paths of the two light beams deflection-scanned in opposite directions by the light deflector, and which are closest to the light deflector, are rotated in the same rotational direction around an axis extending along a main scanning direction.

The imaging optical devices closest to the light deflector may be rotated by the same rotational angle.

The refractive power in the sub-scanning direction of the imaging optical devices closest to the light deflector may be zero.

The two adjacent imaging optical devices may be rotated around either a geometrical center or a vertex of an incident surface.

The imaging optical devices may comprise f-θ lenses.

According to another aspect of the present disclosure, a light scanning unit may be provided to include a light source, a light deflector and an imaging optical system. The light source may be configured to emit a plurality of light beams. The light deflector may be configured to deflection-scan the plurality of light beams. The imaging optical system may form images of the plurality of light beams deflection-scanned by the light deflector on scanned surfaces, and may comprise at least two imaging optical devices in each light path of the plurality of light beams. Imaging optical devices that are closest to the light deflector among the at least two imaging optical devices disposed in each light path of the plurality of the light beams may be inclined with respect to the light deflector.

The imaging optical devices, which are respectively disposed on the light paths of two light beams deflection-reflected in opposite directions by the light deflector, and which are closest to the light deflector, may be rotated in the same rotational direction around an axis extending along a main scanning direction.

The imaging optical devices closest to the light deflector may be rotated by the same rotational angle.

The refractive power in the sub-scanning direction of the imaging optical devices closest to the light deflector may be zero.

According to yet another aspect of the present disclosure, a light scanning unit may be provided for scanning a light beam received from a light source onto and across a scanned surface. The light scanning unit may comprise a light deflector and a first optical element. The light deflector may be arranged in the light path of the light beam, and may be configured to deflect the light beam received from the light source along a main scanning direction across the scanned surface. The light deflector may have a reflective surface upon which the light beam received from the light source incident. The first optical element may be arranged in the light path between the light deflector and the scanned surface, and may have a first light incident surface upon which the light beam deflected by the light deflector is incident. The first light incident surface may be inclined with respect to the light deflector such that the first light incident surface of the first optical element and the reflective surface of the light deflector are not parallel to each other.

The light scanning unit may further comprise a second optical element arranged in the light path of the light beam between the light deflector and the scanned surface downstream of the first optical element. The second optical element may have a second light incident surface upon which the light beam passing through the first optical element is incident.

The first light incident surface and the second light incident surface may be inclined by the same inclination angle.

The first light incident surface and the second light incident surface may be inclined with the same inclination direction.

BRIEF DESCRIPTION OF THE DRAWINGS

Various features and advantages of the present disclosure will become more apparent by the following detailed description of the embodiments thereof with reference to the attached drawings, in which.

DETAILED DESCRIPTION OF SEVERAL EMBODIMENTS

Figure 1:
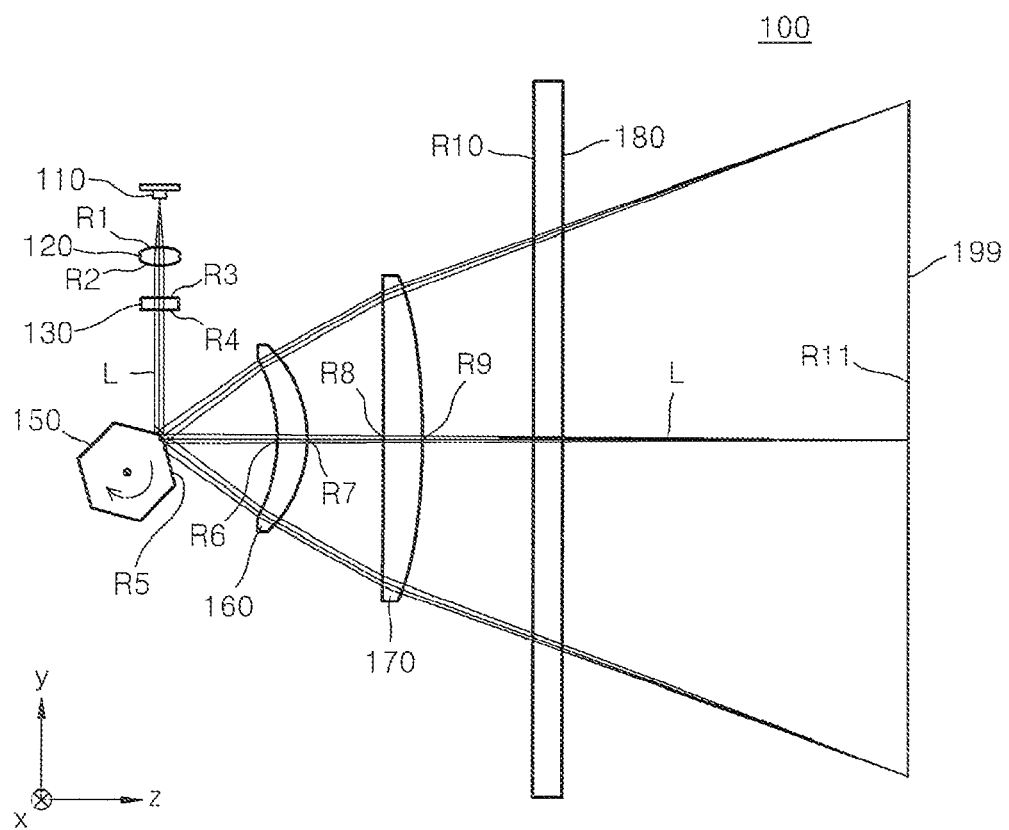
FIG. 1 is a schematic view illustrating a light scanning unit on a main scan plane according to an embodiment of the present disclosure.

Reference will now be made in detail to several embodiments, examples of which are illustrated in the accompanying drawings, wherein like reference numerals refer to like elements throughout, repetitive descriptions of which may be omitted. It should be also noted that in the drawings, the dimensions of the features are not intended to be to true scale and may be exaggerated for the sake of allowing greater understanding. While the embodiments described herein are provided as detailed examples so as to fully describe and to enable those of ordinary skill in the art aspects of the present disclosure, it should be understood that the full scope of the present disclosure is not limited to those details of those embodiments, and may be embodied in many different forms.

Figure 2:
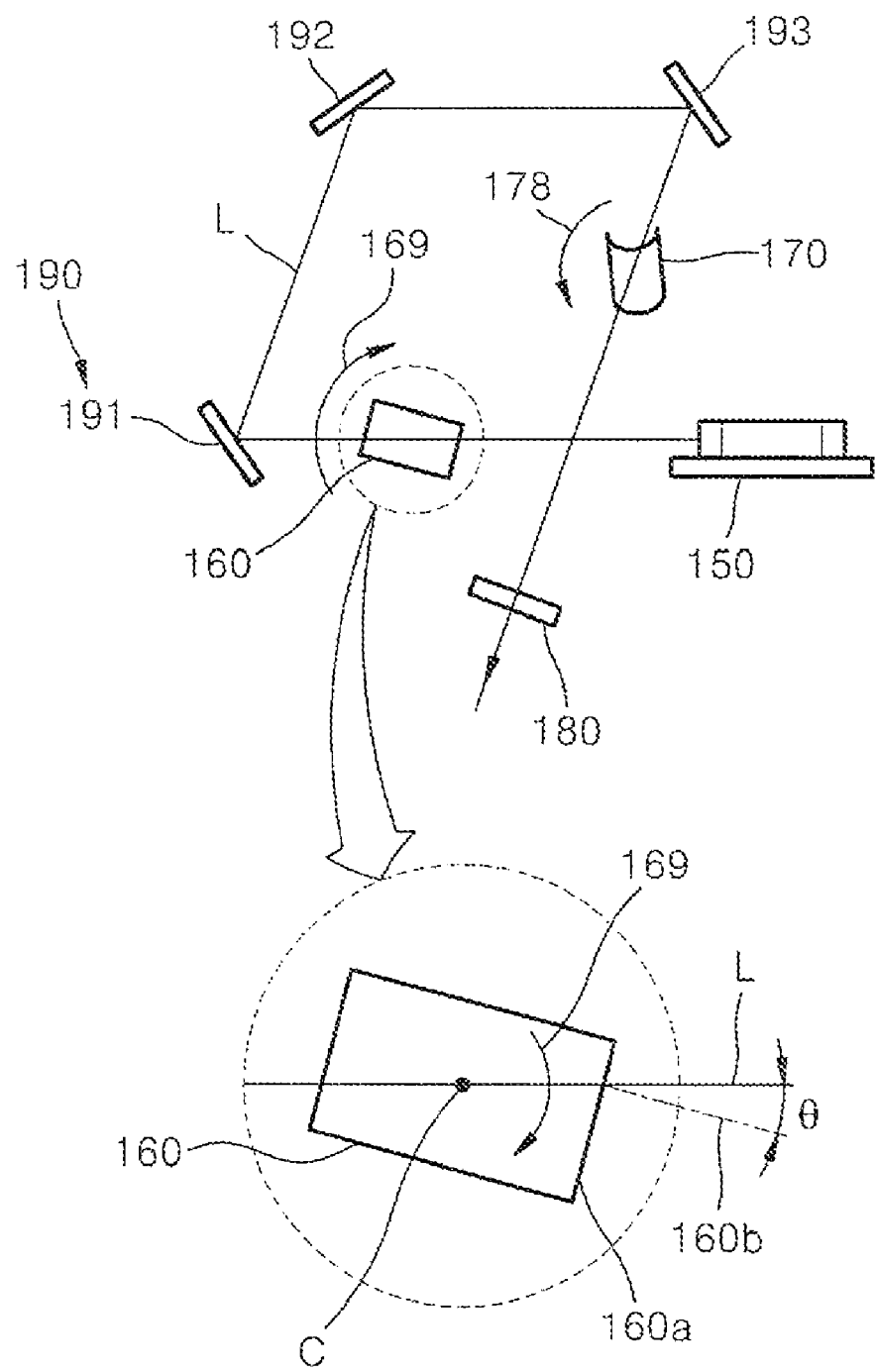
FIG. 2 is a schematic view illustrating an imaging optical system of the light scanning unit shown in FIG. 1 on a sub-scanning plane.

FIG. 1 is a schematic illustration of a light scanning unit 100 according to an embodiment of the present disclosure viewed on the main scan plane. Illustrated in FIG. 2 is the sub-scanning plane view of the imaging optical system of the light scanning unit 100 of FIG. 1. In FIG. 1, the x-axis corresponds to the sub-scanning direction with respect to the surface to be scanned 199, and the y-axis corresponds to the main scanning direction with respect to the surface to be scanned 199. For convenience of explanation, a reflection unit 190 (shown in FIG. 2) is omitted in FIG. 1. The term 'main scanning plane' refers to a plane on which both of the scan line and the light beam are disposed, that is, the y-z plane of FIG. 1. The term 'sub-scanning plane' refers to a plane perpendicular to a main scanning direction, that is, the x-z plane of FIG. 1. In FIG. 1, the main scanning plane is perpendicular to the rotating axis of a light deflector 150 whereas the sub scan plane is parallel to the rotating axis of the light deflector 150.

Referring to FIGS. 1 and 2, the light scanning unit 100 according to an embodiment includes a light source 110, the light deflector 150 and an imaging optical system.

The light source 110 emits a light beam L, such as, for example, a laser light emitted by a laser diode.

The light deflector 150 is for deflection-scanning the light beam L emitted by the light source 110, and may be, for example, a polygonal rotating mirror having a plurality of reflective surfaces. The light deflector 150 rotates clockwise, for example. The light beam L is deflection-reflected by a reflective surface of the light deflector 150, and is scanned to the surface to be scanned 199.

A collimating lens 120 and a cylindrical lens 130 may be disposed on the light path between the light source 110 and the light deflector 150. The collimating lens 120 focuses the light beam L emitted by the light source 110, so that the light beam L becomes parallel light or converging light. The cylindrical lens 130 focuses the light beam L which passed the collimating lens 120 on the light deflector 150 in the main scanning direction and/or the sub-scanning direction, and is formed of at least one lens. Alternatively, the cylindrical lens 130 may be disposed on a light path between the light source 110 and the collimating lens 120 such that the light beam L passing through the cylindrical lens 130 is incident to the collimating lens 120.

The imaging optical system may be disposed on the light path between the light deflector 150 and the surface to be scanned 199, and may include the first and second imaging optical devices 160 and 170 and a reflection unit 190 (shown in FIG. 2) disposed between the first and second imaging optical devices 160 and 170. The light beam L exiting the imaging optical devices 160 and 170 may pass through a flat glass panel 180, and may be scanned across the surface to be scanned 199.

The first and second imaging optical devices 160 and 170 may be, for example, f-θ lenses capable of forming images on the surface to be scanned 199 from the light beam L deflected by the light deflector 150 while allowing the light beam L to be scanned in the main scanning direction at a uniform velocity.

The first and second imaging optical devices 160 and 170 may be disposed slantly with respect to the light path of the light beam L in order to reduce the ghosts due to reflected light. The first and second imaging optical devices 160 and 170 may be rotated clockwise or counter-clockwise around the axis of the main scanning direction (the y axis of FIG. 1).

Furthermore, the first imaging optical device 160 may be designed such that a value of the refraction index in the sub-scanning direction is "0" or close to "0," so as to thereby reduce the deterioration of performance of the light scanning unit 100, such as the deterioration in the beam diameter or a bowing of the scanning line. The term 'sub-scanning direction' refers to a direction perpendicular to the main scan plane on which the light beam L scanned by the light deflector 150 travels.

The reflection unit 190 may operate to fold the light path allowing the imaging optical system to be implemented in a limited space, and may comprise a reflective mirror or a total internal reflection prism, for example.

According to an embodiment, the reflection unit 190 may comprise reflective mirrors 191, 192 and 193 disposed along the light path between the first and second imaging optical devices 160 and 170. As in the configuration shown in FIG. 2, when an odd number of reflective mirrors of the reflection unit 190 are disposed between the first and second imaging optical devices 160 and 170, the first and second imaging optical devices 160 and 170 are rotated in directions opposite to each other with respect to the light path of the light beam L.

For example, as shown in FIG. 2, the first imaging optical device 160 may be rotated in a clockwise direction 169 around the axis of the main scanning direction (the y-axis of FIG. 1), and the second imaging optical device 170 may be rotated in a counter-clockwise direction 178 around the axis of the main scanning direction. According to an embodiment, the directions in which the first and second imaging optical devices 160 and 170 are to be rotated may be determined according to the number of reflective mirrors of the reflection unit 190 disposed between the first and second imaging optical devices 160 and 170 in order to reduce the likelihood of the deterioration of the beam diameter or bowing of the scan line due to the rotation of the first and second imaging optical devices 160 and 170.

That is, generally speaking, convex orientation of a bow due to the slants of the first and second imaging optical devices 160 and 170 may change according to the directions in which the first and second imaging optical devices 160 and 170 are slanted. When the reflection unit 190 is disposed between the first and second imaging optical devices 160 and 170, the convex orientation of the bow mat be reversed. Therefore, in case where the number of reflective mirrors of the reflection unit 190 is an odd number, the first and second imaging optical devices 160 and 170 may be rotated in opposite directions to each other as shown in FIG. 2. On the other hand, in the case where the number of reflective mirrors of the reflection unit 190 is an even number, the first and second imaging optical devices 160 and 170 may be rotated in same directions to each other. Accordingly, the directions in which the first and second imaging optical devices 160 and 170 are rotated may be decided by considering the reversion of orientation of the bow of the reflection unit 190 disposed between the first and second imaging optical devices 160 and 170, in the light scanning unit 100 according to an embodiment of the present disclosure.

In FIG. 2, the reference number 160a indicates an incident surface of the first imaging optical device 160, and the reference number 160b indicates a direction perpendicular to the incident surface 160a of the first imaging optical device 160. The angle θ by which the first imaging optical device 160 is to be rotated may be determined according to the distance between the reflective surface of the light deflector 150 and the first imaging optical device 160, a significant surface of the light deflector 150 in the sub-scanning direction, and according to the length of the first imaging optical device 160 in the sub-scanning direction. For example, the angle θ indicates a degree of clockwise rotation around the axis of the main scanning direction (the y-axis of FIG. 1). According to an embodiment, the angle θ may be less than or equal to about 4 degrees to minimize the possibility of performance degradation due to the rotation of the first imaging optical device 160. The first and second imaging optical devices 160 and 170 may be rotated around either a geometrical center or a vertex of an incident surface. If the refractive power of the first imaging optical device 160 is generated mainly at the incident surface of the first imaging optical device 160, aberration due to the rotation of the first imaging optical device 160 may be reduced by rotating the first imaging optical device 160 around a vertex of the incident surface. The magnified section of FIG. 2 shows a case where the first imaging optical device 160 is rotated around a geometrical center C.

Figure 3:
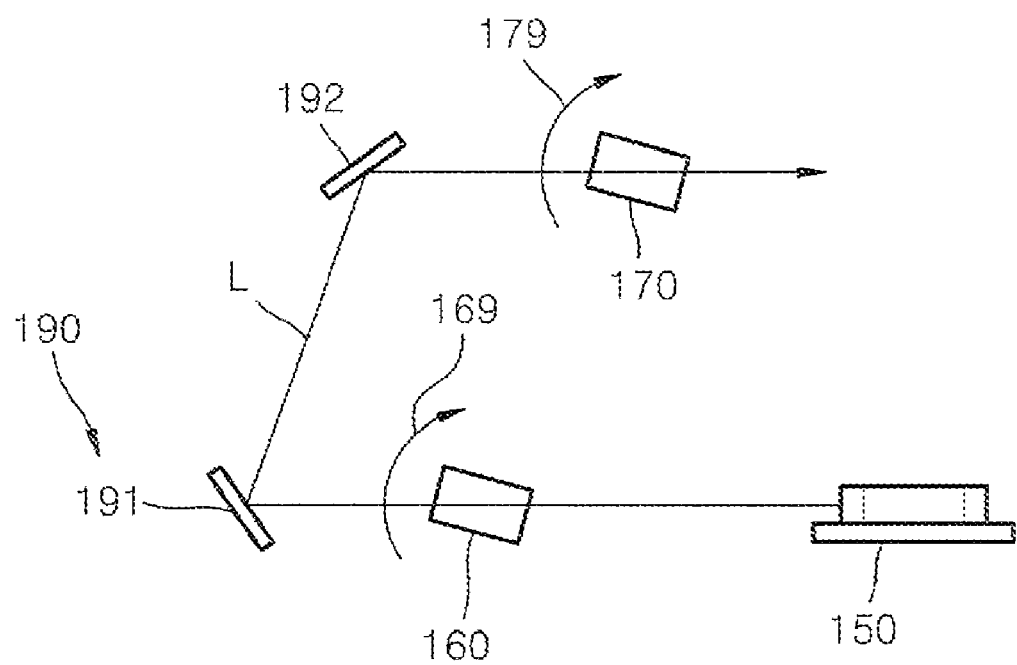
FIG. 3 is a modification of the light scanning unit of FIG. 1, where the number of reflective mirrors of a reflection unit disposed between first and second imaging optical devices is an even number.

FIG. 3 is a modification of the light scanning unit 100 of FIG. 1, where the number of reflective mirrors of the reflection unit 190 disposed between the first and second imaging optical devices 160 and 170 is an even number. In case where two reflective mirrors 191 and 192 are disposed between the first and second imaging optical devices 160 and 170, as shown in FIG. 3, the first and second imaging optical devices 160 and 170 are rotated in the same direction. In other words, the first imaging optical device 160 is rotated in the clockwise direction 169, and the second imaging optical device 170 is also rotated in the clockwise direction 179.

Table 1 below shows a specific example of optical design of the light scanning unit 100 according to the embodiment shown in FIGS. 1 and 2.

TABLE 1

| | Radius Of Curvature R (mm) | Distance Between Surfaces d (mm) | Refraction Index n |
|---|---|---|---|
| Light Source (Wavelength 655 nm) | | 13.3406 | |
| Incident Surface R1 of Collimating Lens | 69.553 | 3 | 1.580182 |
| Light Emitting Surface R2 of Collimating Lens | −9.611 | 9.5 | |
| Incident Surface R3 of Cylindrical Lens | 24.8 | 3 | 1.530503 |
| Light Emitting Surface R4 of Cylindrical Lens | infinity | 42.86 | |
| Reflective Surface R5 of Light Deflector | infinity | 31 | |
| Incident Surface R6 of First Imaging Optical Device (Main scanning direction) | −62.1285 | 8 | 1.530503 |
| Incident Surface R6 of First Imaging Optical Device (Sub scanning direction) | infinity | — | |
| Light Emitting Surface R7 of First Imaging Optical Device (Main scanning direction) | −42.1349 | 21 | |
| Light Emitting Surface R7 of First Imaging Optical Device (Sub scanning direction) | infinity | — | |

TABLE 1-continued

| | Radius Of Curvature R (mm) | Distance Between Surfaces d (mm) | Refraction Index n |
|---|---|---|---|
| Incident Surface R8 of Second Imaging Optical Device (Main scanning direction) | 1789.11 | 10 | 1.530503 |
| Incident Surface R8 of Second Imaging Optical Device (Sub scanning direction) | −32.45 | — | |
| Light Emitting Surface R9 of Second Imaging Optical Device (Main scanning direction) | −786.8839 | 10 | |
| Light Emitting Surface R9 of Second Imaging Optical Device (Sub scanning direction) | −15.038 | — | |
| Flat-Panel Glass R10 | infinity | 1.9 | 1.514362 |
| Surface To Be Scanned R11 | infinity | 117.97 | |

Figure 4:
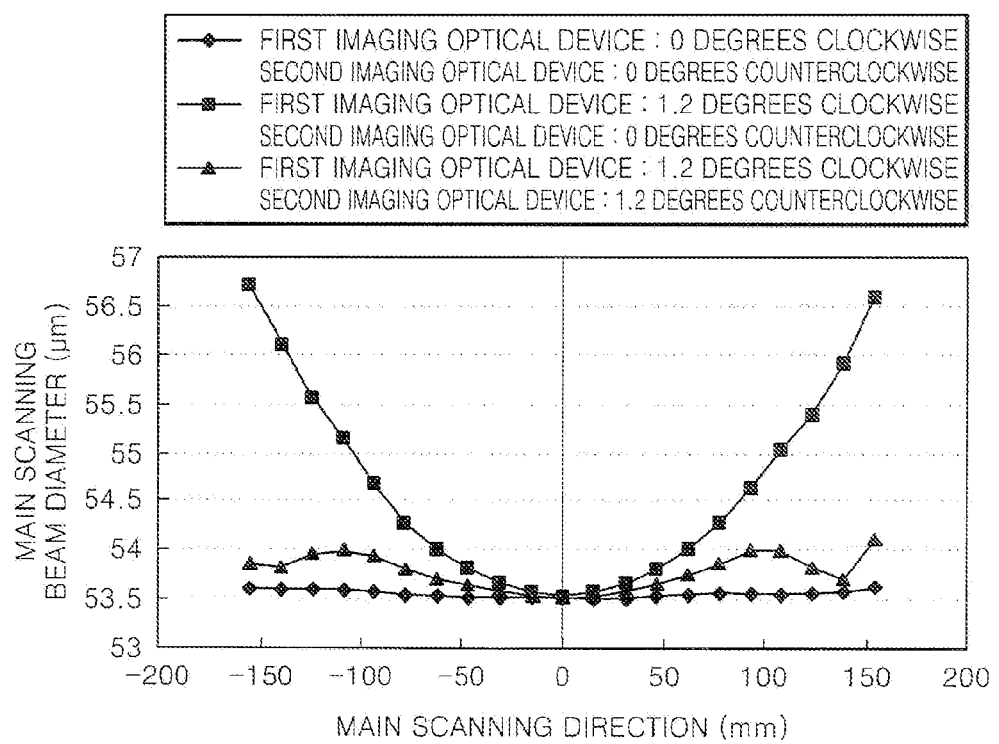
FIG. 4 shows characteristics of beam diameters in the light scanning unit of FIG. 1 in the main scanning direction with respect to rotation of an imaging optical device.
Figure 5:
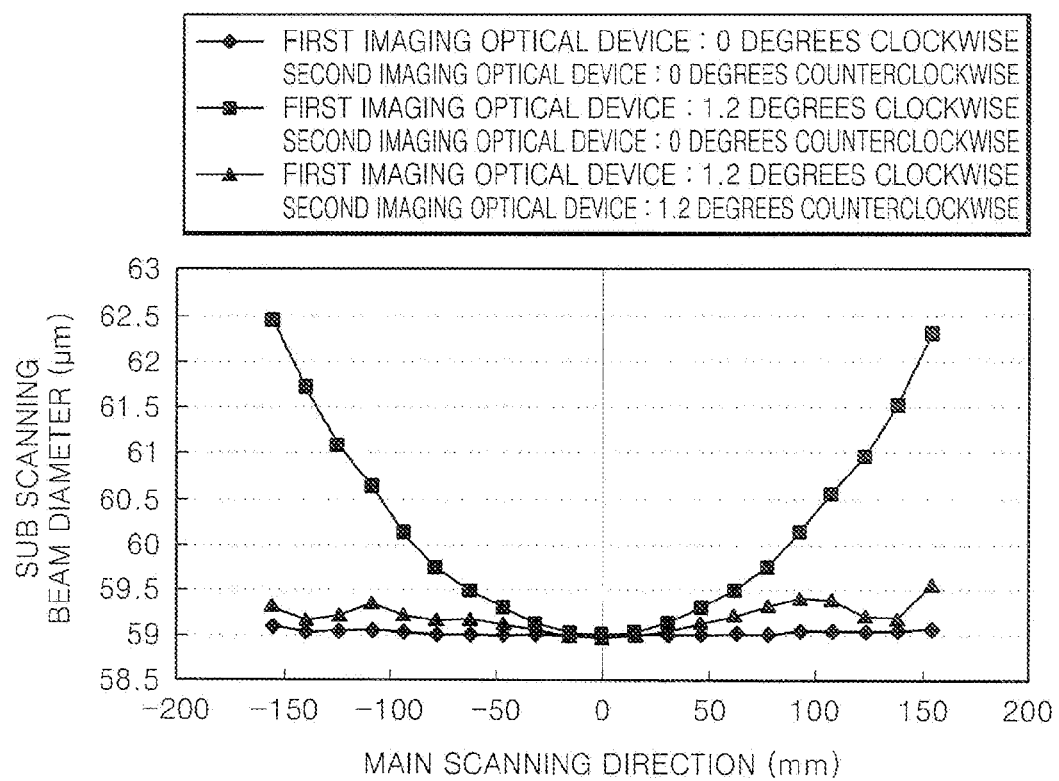
FIG. 5 shows characteristics of beam diameters in the light scanning unit of FIG. 1 in the sub-scanning direction with respect to rotation of an imaging optical device.
Figure 6:
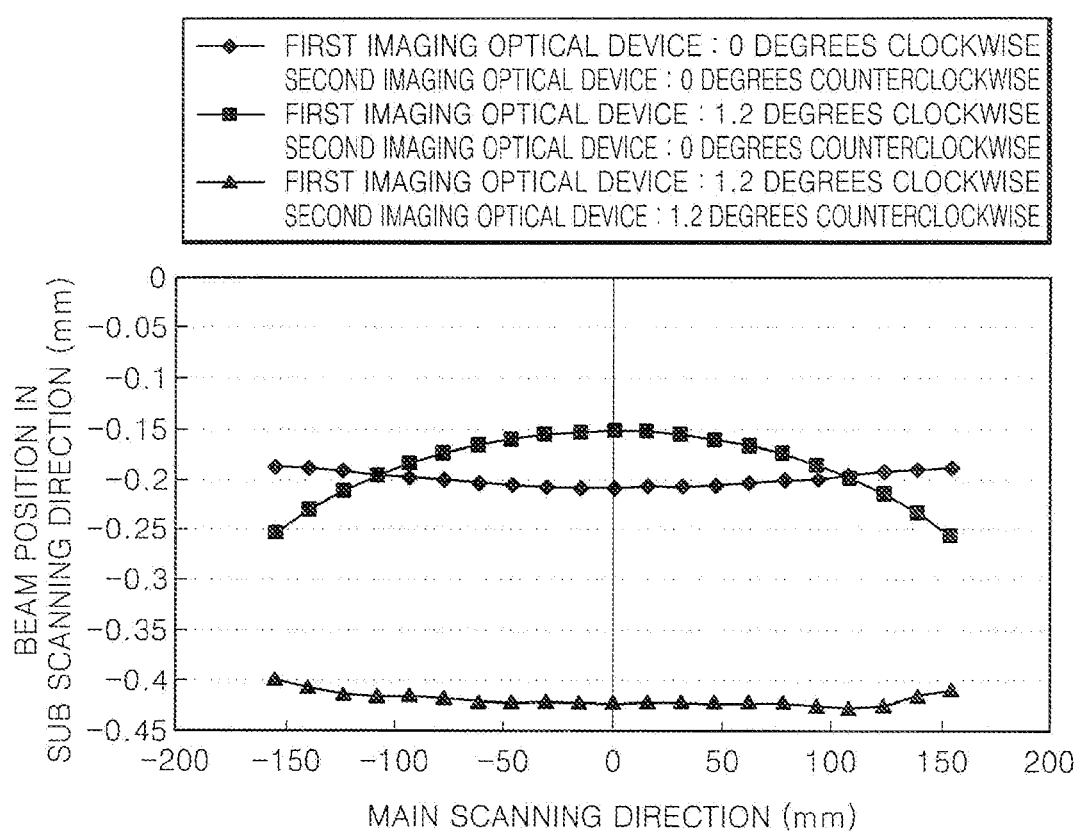
FIG. 6 shows characteristics of bowing of the light beam of the light scanning unit of FIG. 1 with respect to rotation of an imaging optical device.

FIG. 4 shows the characteristics of beam diameters in the main scanning direction with respect to the rotation of an imaging optical device while FIG. 5 shows the characteristics of beam diameters in the sub-scanning direction with respect to the rotation of an imaging optical device. FIG. 6 shows the characteristics of bowing of the scan line with respect to the rotation of an imaging optical device. Graphs shown in FIGS. 4 through 6 are based on empirical data obtained from a light scanning unit designed as shown in Table 1 above.

Referring to FIGS. 4 and 5, it can be observed that compared to the case when the first and second imaging optical devices 160 and 170 are not rotated, when only the first imaging optical device 160 is rotated in the clockwise direction (see 169 of FIG. 2) by 1.2 degrees, both the main scanning beam diameter and the sub-scanning beam diameter increase rapidly. However, if the second imaging optical device 170 is rotated in the counter-clockwise direction (see 178 of FIG. 2) by 1.2 degrees in correspondence to the rotation of the first imaging optical device 160, the main scanning beam diameter and the sub-scanning beam diameter become even throughout all regions in the main scanning direction. The term 'the main scanning beam diameter' herein refers to the beam diameter of the spot imaged on the surface to be scanned 199 in the main scanning direction whereas the term 'the sub-scanning beam diameter' refers to the beam diameter of the spot imaged on the surface to be scanned 199 in the sub-scanning direction.

Similarly, referring to FIG. 6, it can be observed that in comparison to when the first and second imaging optical devices 160 and 170 are not rotated, when only the first imaging optical device 160 is rotated in the clockwise direction 169 by 1.2 degrees, scan line bow occurs, that is, the scan line is bent more significantly farther away from the center of the main scanning direction. However, if the second imaging optical device 170 is rotated in the counter-clockwise direction 178 by 1.2 degrees in correspondence to the rotation of the first imaging optical device 160, the scan line becomes almost parallel to the horizontal axis of the graph of FIG. 6, that is, to the main scanning direction, thus resulting in a reduction of scan line bow.

Figure 7:
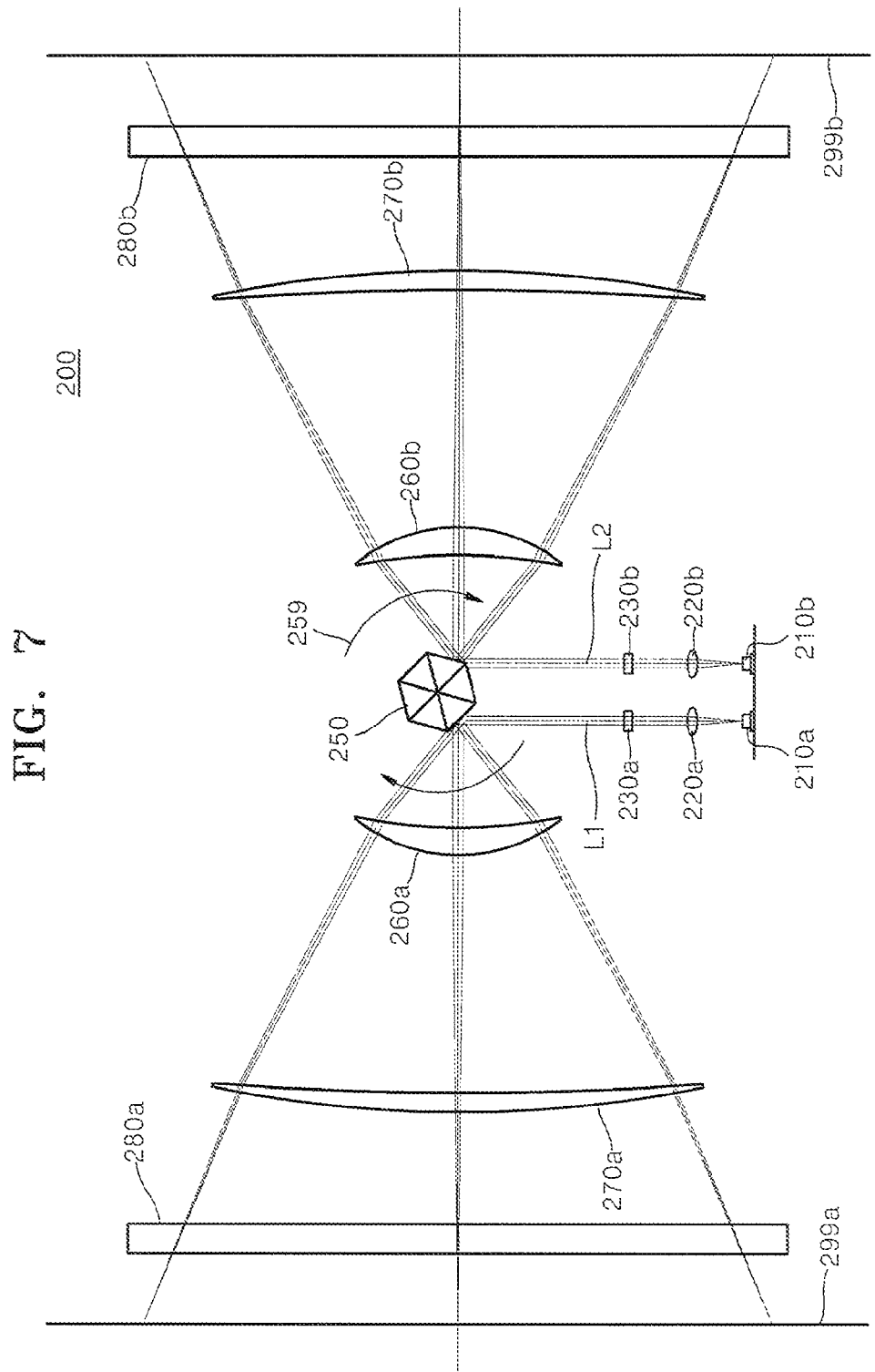
FIG. 7 is a schematic view illustrating a light scanning unit on a main scan plane according to another embodiment of the present disclosure.
Figure 8:
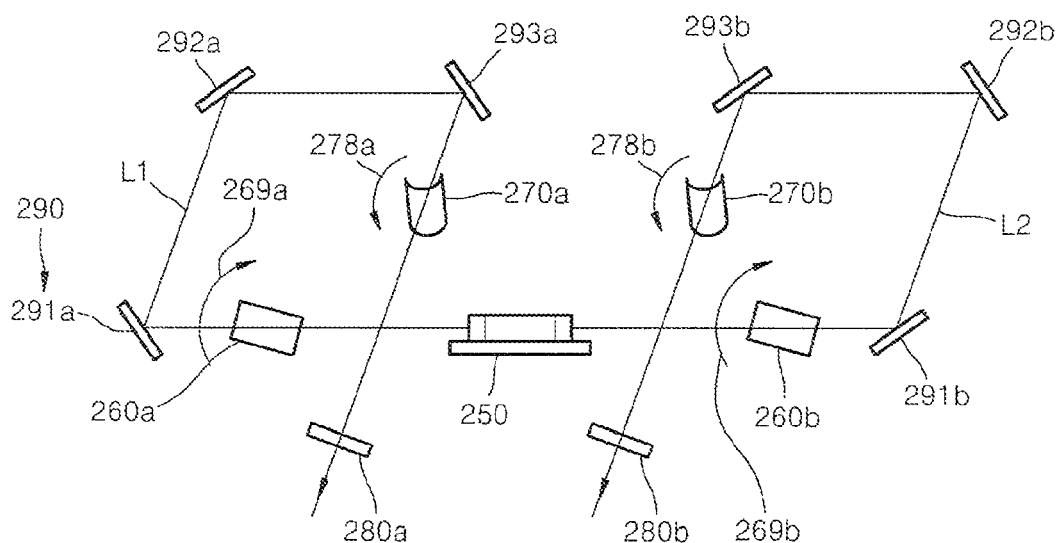
FIG. 8 is a schematic view illustrating an imaging optical system of the light scanning unit shown in FIG. 7 on a sub-scanning plane.

FIG. 7 is a schematic illustrating a main scanning plane view of a light scanning unit according to another embodiment of the present disclosure. FIG. 8 is a schematic illustrating sub-scanning plane view of the imaging optical system of the light scanning unit shown in FIG. 7. For convenience of explanation, a reflection unit 290 (shown in FIG. 8) is omitted in FIG. 7.

Referring to FIGS. 7 and 8, the light scanning unit 200 according to an embodiment may include the first and second light sources 210a and 210b, a light deflector 250 and an imaging optical system.

The first and second light sources 210a and 210b emit first and second light beams L1 and L2, respectively, and may be laser diodes emitting laser beams, for example.

The light deflector 250 is for deflection-scanning the first and second light beams L1 and L2 that are emitted by the first and second light sources 210a and 210b, respectively, and may, for example, be a polygonal rotating mirror. The light deflector 250 rotates in, for example, the clockwise direction. The first and second light beams L1 and L2 may be deflection-reflected by different reflective surfaces of the light deflector 250, and may be scanned to the first and second surfaces to be scanned 299a and 299b through the flat glass panels 280a and 280b in directions opposite to each other.

First and second collimating lenses 220a and 220b and first and second cylindrical lenses 230a and 230b may be respectively disposed in the light paths between the first and second light sources 210a and 210b and the light deflector 250.

The imaging optical system according to an embodiment may include the first and second imaging optical devices 260a and 270a of the first light beam L1, which are disposed on the light path of the first light beam L1 and the first and second imaging optical devices 260b and 270b of the second light beam L2, which are disposed on the light path of the second light beam L2. Furthermore, reflection units 290 are respectively disposed between the first and second imaging optical devices 260a and 270a and between the first and second imaging optical devices 260b and 270b as shown in FIG. 8.

The first and second imaging optical devices 260a, 260b, 270a and 270b may be f-θ lenses capable of imaging spots on the surfaces to be scanned 299a and 299b, respectively, from the light beams L1 and L2 deflected by the light deflector 250 while allowing the scanning of the light beams L1 and L2 in the main scanning direction at a uniform velocity. According to an embodiment, the first and second imaging optical devices 260a, 270a, 260b and 270 may be disposed symmetrically with respect to the light deflector 250 to enable common optical designs of the first and second imaging optical devices 260a, 260b, 270a and 270b.

The first and second imaging optical devices 260a, 260b, 270a and 270b are rotatably disposed with respect to the respective light paths of the light beams L1 and L2 to reduce the ghosts due to reflected light. The first and second imaging optical devices 260a, 260b, 270a and 270b may be rotated clockwise or counter-clockwise around the axis of the main scanning direction In the light scanning unit 200, the reflection unit 290 comprises three reflective mirrors 291a, 292a and 293a disposed between the first and second imaging optical devices 260a and 270a and three reflective minors 291b 292b and 293b disposed between the first and second imaging optical devices 260b and 270b. When the number of reflective mirrors of the reflection unit 290 on each light path is an odd number, the first imaging optical device 260a for the first light beam L1 and the first imaging optical device 260b for the second light beam L2 are rotated in clockwise directions 269a and 269b, respectively, whereas the second imaging optical device 270a for the first light beam L1 and the second imaging optical device 270b for the second light beam L2 are rotated in counter-clockwise directions 278a and 278b, respectively. In other words, the first and second imaging optical devices 260a and 270a of the first light beam L1 are rotated in directions opposite to each other with respect to the light path of the first light beam L1, and the first and second imaging optical devices 260*b* and 270*b* of the second light beam L2 are rotated in directions opposite to each other with respect to the light path of the second light beam L2.

Furthermore, the first imaging optical device 260*a* of the first light beam L1, which is the closest imaging optical device to the light deflector 250 on the light path of the first light beam L1, and the first imaging optical device 270*a* of the second light beam L2, which is the closest imaging optical device to the light deflector 250 on the light path of the second light beam L2, are rotated in the same direction. The term 'rotation in the same direction' above is based on the viewpoint of the arrangement shown in FIG. 8. If FIG. 8 is viewed with the viewpoint of the direction in which light travels, the first imaging optical device 260*a* of the first light beam L1 is rotated such that the incident surface thereof is rotated downward with respect to the direction in which the first light beam L1 travels while the second imaging optical device 270*a* of the second light beam L2 is rotated such that the incident surface thereof is rotated upward with respect to the direction in which the second light beam L2 travels. Thus, from the viewpoint of the direction in which light travels, the first imaging optical devices 260*a* and 270*a* are rotated in directions opposite to each other.

Figure 9:
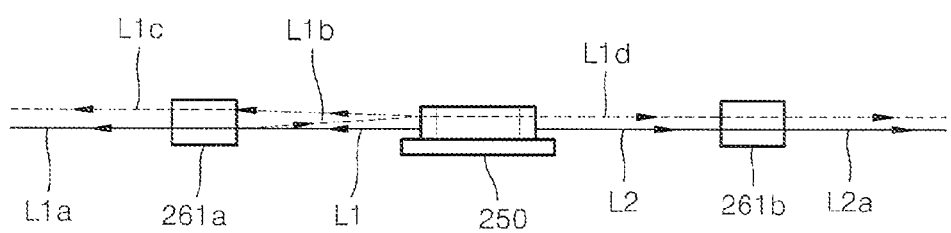
FIG. 9 illustrates a light path of a light beam reflected by first imaging optical devices according to a comparative example.
Figure 10:
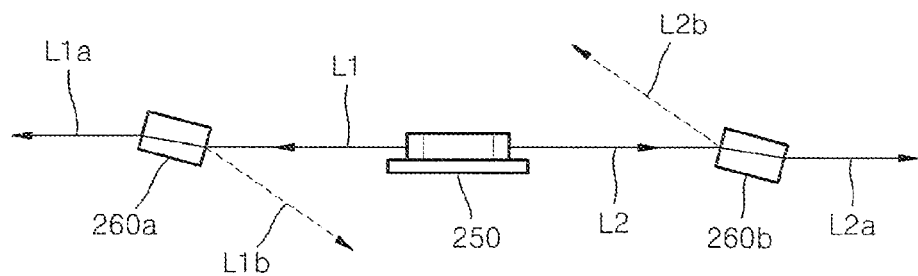
FIG. 10 illustrates a light path of a light beam reflected by first imaging optical devices according to an embodiment of the present disclosure.

FIG. 9 illustrates a light path of a light beam reflected by first imaging optical devices according to a comparative example while FIG. 10 illustrates a light path of a light beam reflected by the first imaging optical devices according to an embodiment of the present disclosure. In the comparative example of FIG. 9, the first imaging optical devices 261*a* and 261*b* are not inclined.

For the sake of brevity, the light paths illustrated in FIG. 9 are illustrative of mainly the first light L1, and does not include the light paths of the reflect light of the second light L2. Referring to FIG. 9, the main light beam L1*a* of first light beam L1 reflected by the light deflector 250 passes the first imaging optical device 261*a* of the first light beam L1, but the light beam L1*b* that is a part of the first light beam L1 is reflected by the first imaging optical device 261*a* back towards the light deflector 250. In the light scanning unit of the comparative example, the first imaging optical device 261*a* of the first light beam L1 is not inclined with respect to the light deflector 250, and thus the light beam L1*b* of the first light beam L1 reflected by the first imaging optical device 261*a* of the first light beam L1 may cause ghosting. For example, the light beam L1*b* of the first light beam L1 reflected by the first imaging optical device 261*a* may be reflected by the light deflector 250 again, and may become a first ghost light beam L1*c* passing through the first imaging optical device 261*a*. In addition, the light beam L1*b* of the first light beam L1 reflected by the first imaging optical device 261*a* may also proceed to the first imaging optical devices 261*b* in the light path of the second light beam L2, which may be on the opposite side of the light deflector 250, and may become a second ghost light beam L1*d* of the first light beam L1 that passes through the first imaging optical device 261*b* for the second light beam L2. The first and second ghost light beams L1*c* and L1*d* are then imaged respectively on the scanning surfaces 299*a* and 299*b* (see FIG. 7) along with the normal main light beams L1*a* and L2*a*, and may thereby cause ghosting in the resulting image.

On the other hand, as illustrated in FIG. 10, according to an embodiment of the present disclosure, the first imaging optical devices 260*a* and 260*b* are inclined with respect to the light deflector 250, and thus even though some light beams L1*b* and L2*b* are reflected by the first imaging optical devices 260*a* and 260*b*, they do not cause ghost. For example, the light beam L1*b*, which is part of the first light beam L1 reflected by the first imaging optical device 260*a* in the path of first light beam L1, does not become incident on the light deflector 250 or on the first imaging optical device 260*b* in the path of the second light beam L2, which is on the opposite side to the light deflector 250. Accordingly, only the main light beams L1*a* and L2*a* respectively of the first and second light beams L1 and L2 reflected by the light deflector 250 pass through the first imaging optical devices 260*a* and 260*b*.

Referring again to FIGS. 7 and 8, the convex orientation of a scan line bow due to the rotation of the first and second imaging optical devices 260*a*, 260*b*, 270*a* and 270*b* may change according to the directions in which the first and second imaging optical devices 260*a*, 260*b*, 270*a* and 270*b* are rotated. According to an embodiment of the present disclosure, the first imaging optical device 260*a* of the first light beam L1, which is the closest imaging optical device to the light deflector 250 on the light path of the first light beam L1, and the first imaging optical device 260*b* of the second light beam L2, which is the closest imaging optical device to the light deflector 250 on the light path of the second light beam L2, are rotated in the same direction, so that the convex orientation of bow of the first light beam L1 and the convex orientation of bow of the second light beam L2 may be the same. Furthermore, the degree of rotation of the first imaging optical device 260*a* in the first light beam L1 and the degree of rotation of the first imaging optical device 270*a* in the second light beam L2 may be made to be substantially equal to each other so that the amount of bowing of the scan line of the first light beam L1 and the amount of bowing of the scan line of the second light beam L2 may be substantially the same. As a result, the two scan line bows may be made to correspond one another as much as possible. Accordingly, the orientations and curvatures of the respective bows of the first and second light beams L1 and L2 may be equalized to minimize the color registration error due to the scan line bow.

Figure 11:
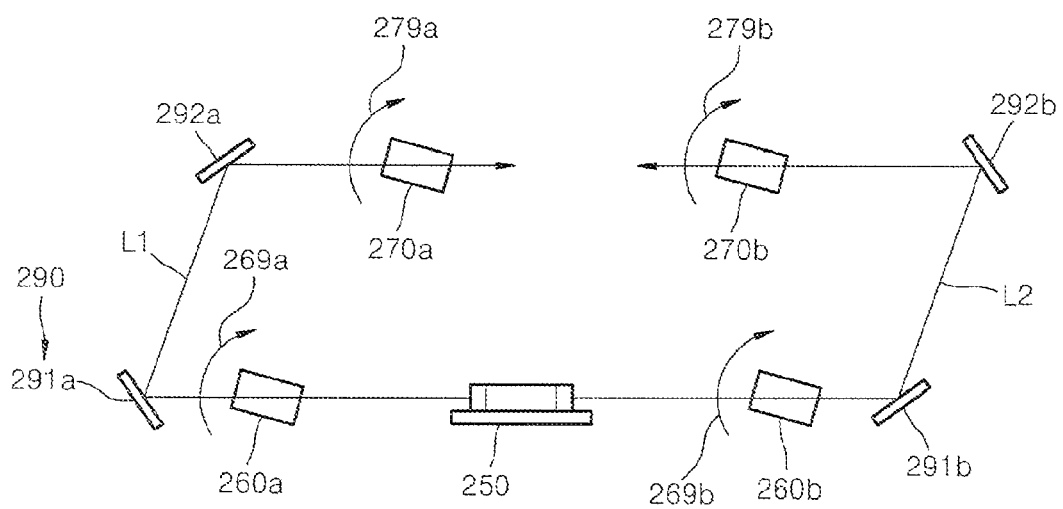
FIG. 11 is a modification of the light scanning unit, where the number of reflective mirrors of the reflection unit on each light path is an even number.

FIG. 11 is a modification of the light scanning unit 200, where the number of reflective mirrors of the reflection unit 290 on each light path is an even number. If the reflection unit 290 comprises two reflection mirrors 291*a* and 292*a* disposed between the first and second imaging optical devices 260*a* and 270*a* in the path of the first light beam L1 and two reflection mirrors 291*b* and 292*b* disposed between the first and second imaging optical devices 260*b* and 270*b* in the path of the second light beam L2, respectively, the first and second imaging optical devices 260*a* and 270*a* of the first light beam L1 are rotated in the same clockwise directions 269*a* and 279*a*, and the first and second imaging optical devices 260*b* and 270*b* of the second light beam L2 are also rotated in the same clockwise directions 269*b* and 279*b*.

Accordingly, the deterioration of the beam diameter, scan line bow, and color registration error may be reduced by considering the number of reflective mirrors of the reflection unit 290 disposed between the first and second imaging optical devices 260*a*, 260*b*, 270*a* and 270*b*, by determining directions in which the first and second imaging optical devices 260*a*, 260*b*, 270*a* and 270*b* are to be rotated, and by rotating the first imaging optical devices 260*a* and 260*b*, which are the closest imaging optical devices to the light deflector 250, in the same clockwise direction 269*a* and 269*b*.

Figure 12:
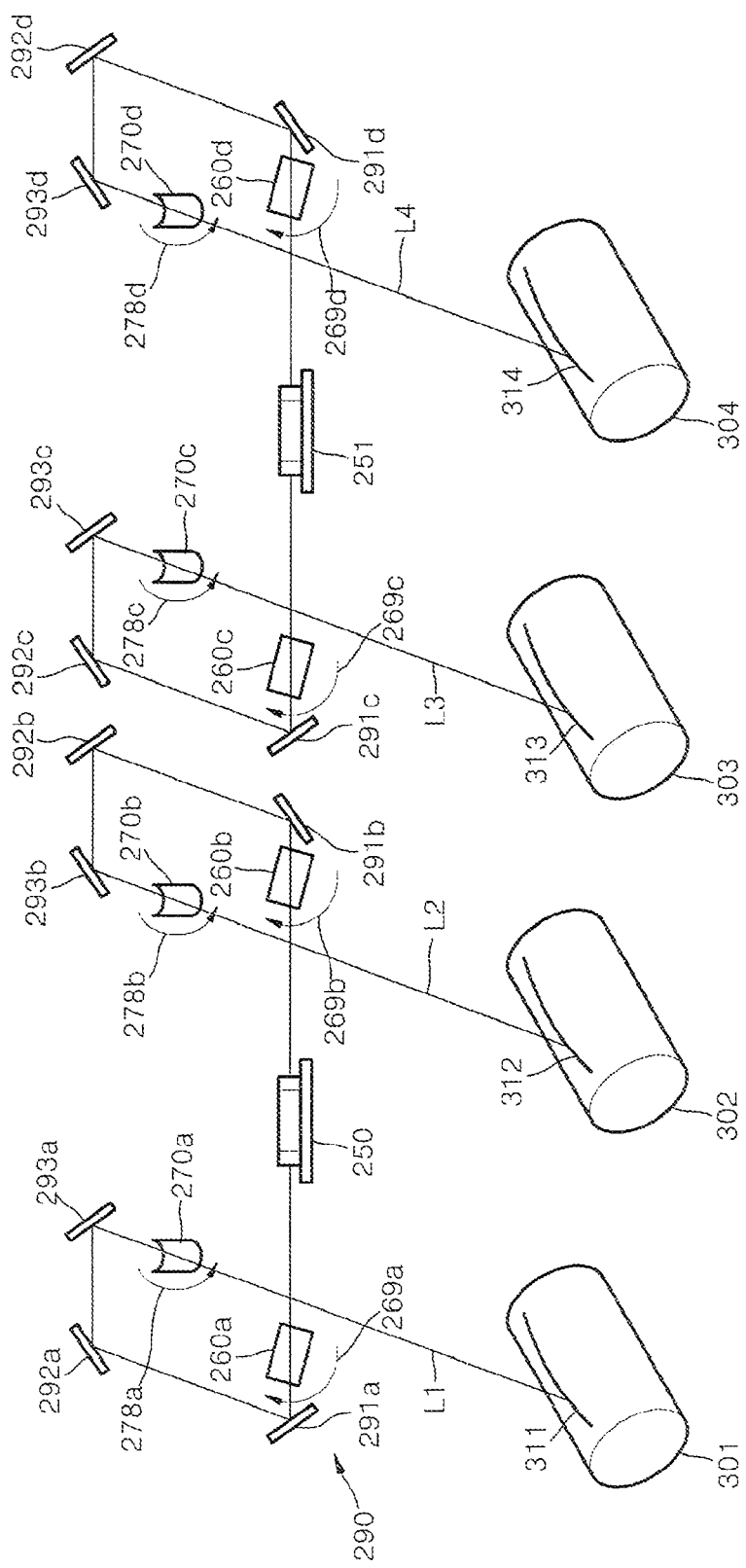
FIG. 12 is a schematic view illustrating a light scanning unit according to another embodiment of the present disclosure.

FIG. 12 is a schematic view illustrating a light scanning unit according to another embodiment of the present disclosure.

The light scanning unit of according to an embodiment includes a light source unit (not shown) emitting first through fourth light beams L1, L2, L3 and L4, light deflection units deflecting and scanning the first through fourth light beams L1, L2, L3 and L4, and an imaging optical system forming the first through fourth light beams L1, L2, L3 and L4 images on the scanning surfaces of the first through fourth photosensitive drums 301, 302, 303 and 304. The first through fourth photosensitive drums 301, 302, 303 and 304 form electrostatic latent images, for example, respectively corresponding to yellow, magenta, cyan and black images as the first through fourth light beams L1, L2 L3, and L4 are incident thereon.

The optical elements disposed on the light paths of the first and second light beams L1 and L2 may be the optical elements denoted by the same reference numerals of the light scanning unit 200 described with reference to FIGS. 7 and 8. In the same manner, the optical elements disposed on the light paths of the third and fourth light beams L3 and L4 may be the optical elements described with reference to FIGS. 7 and 8. That is, a first imaging optical device 260c of the third light beams L3 and a second imaging optical device 270c of the third light beams L3 are disposed on the light path of the third light beams L3 while the first imaging optical device 260d and a second imaging optical device 270d are disposed on the light path of the fourth light beams L4. And three reflective mirrors 291c, 292c and 293c are disposed between the first and second imaging optical devices 260c and 270c of the third light beams L3. Three reflective mirrors 291d, 292d and 293d are disposed between the first and second imaging optical devices 260d and 270d of the fourth light beams L4.

The reflection unit 290 further comprises the three reflective mirrors 291a, 292a and 293a disposed on the light path of the first light beam L1, the three reflective mirrors 291b, 292b and 293b disposed on the light path of the second light beam L2, the three reflective mirrors 291c, 292c and 293c disposed on the light path of the third light beam L3 and the three reflective mirrors 291d, 292d and 293d disposed on the light path of the fourth light beam L4. Since the number of reflective mirrors of the reflection unit 290 on each light path is an odd number, the first imaging optical devices 260a, 260b, 260c 260d are rotated in one direction, for example, clockwise directions 269a, 269b, 269c and 269d whereas the second imaging optical devices 270a, 270b, 270c and 270d are rotated in the opposite direction, for example, in the counterclockwise directions 278a, 278b, 278c and 278d. In other words, the first imaging optical devices 260a, 260b, 260c, 260d and the second imaging optical devices 270a, 270b, 270c, and 270d are rotated in directions opposite to each other. Accordingly, the beam diameters of the light beam L1, L2, L3 and L4 may become even throughout all regions in the main scanning direction, and the bowing of the scan line may be reduced.

Further, if the light deflector 250 and 251 rotate in the same rotational direction, the first light beam L1 and the third light beam L3 are scanned in the same direction while the second light beam L2 and the fourth light beam L4 are scanned in the same direction. Thus, the inclination of the first imaging optical device 260a of the first light beam L1 and that of the first imaging optical device 260c of the third light beam L3 are arranged to be in the same direction with respect to the proceeding of the first and third light beams L1 and L3 while the inclination of the first imaging optical device 260b of the second light beam L2 and that of the first imaging optical device 260d of the fourth light beam L4 are arranged to be in the same direction with respect to the proceeding of the second and fourth light beams L2 and L4. Also, the first light beam L1 and the second light beam L2 are scanned in the directions opposite to each other by the first light deflector 250 while the third light beam L3 and the fourth light beam L4 are scanned in opposite directions with respect to each other by the second light deflector 251. Thus, the first imaging optical device 260a of the first light beam L1 and the first imaging optical device 260b of the second light beam L2 are inclined in opposite directions with respect to the proceeding of the first and second light beams L1 and L2 while the first imaging optical device 260c of the third light beam L3 and the first imaging optical device 260d of the fourth light beam L4 are inclined in opposite directions with respect to the proceeding of the third and fourth light beams L3 and L4. With these inclination directions of the first imaging optical devices 260a, 260b, 260c and 260d, the bowing of the scanning lines can be made to be in the same direction.

Although a case in which an imaging optical system includes two imaging optical devices per light path is shown in above embodiments, it is merely an example, and the configurations of the imaging optical system may vary. For example, the imaging optical system may include three or more imaging optical devices in one or more light paths. In such a case, the directions in which two imaging optical devices, which are the closest to a light deflector, are to be rotated may be determined according to the number of the reflection units disposed between the two imaging optical devices.

While the present disclosure has been particularly shown and described with reference to several embodiments thereof, it will be understood by those of ordinary skill in the art that various changes in form and details may be made thereto without departing from the principles and spirit of the present disclosure, the proper scope of which is defined in the following claims and their equivalents.

What is claimed is:

1. A light scanning unit, comprising:
a light source configured to emit a light beam;
a light deflector configured to deflect the light beam; and
an imaging optical system configured to form an image of the deflected light beam on a surface to be scanned, the imaging optical system comprising at least two imaging optical devices that are disposed on a light path between the light deflector and the surface to be scanned,
wherein two adjacent imaging optical devices from among the at least two imaging optical devices are inclined with respect to the light path, and
wherein the inclination directions of the two adjacent imaging optical devices are determined according to the number of reflection units that are disposed on the light path between the two adjacent imaging optical devices.

2. The light scanning unit of claim 1, wherein an odd number of the reflection units are disposed on the light path between the two adjacent imaging optical devices, the two adjacent imaging optical devices being inclined in directions opposite to each other.

3. The light scanning unit of claim 1, wherein no reflection unit or an even number of the reflection units are disposed on the light path between the two adjacent imaging optical devices, the two adjacent imaging optical devices being inclined in the same direction.

4. The light scanning unit of claim 1, wherein the two adjacent imaging optical devices are rotated either clockwise or counterclockwise around an axis extending along a main scanning direction.

5. The light scanning unit of claim 1, wherein the two adjacent imaging optical devices are rotated by an angle that is less than or equal to 4 degrees.

6. The light scanning unit of claim 1, wherein the reflection units comprise either a reflective mirror or a total reflection prism.

7. The light scanning unit of claim 1, further comprising at least one additional light source each configured to emit another light beam, wherein the imaging optical system further comprises at least two imaging optical devices arranged on each light path of the light beams deflected by the light deflector, and wherein imaging optical devices closest to the light deflector in each light path of the light beams are inclined with respect to the respective light path.

8. The light scanning unit of claim 7, wherein two light beams reflected by the light deflector are deflection-scanned in opposite directions, and the imaging optical devices, which are respectively disposed on the light paths of the two light beams deflection-scanned in opposite directions by the light deflector, and which are closest to the light deflector, are rotated in the same rotational direction around an axis extending along a main scanning direction.

9. The light scanning unit of claim 8, wherein the imaging optical devices closest to the light deflector are rotated by the same rotational angle.

10. The light scanning unit of claim 8, wherein refractive power in the sub-scanning direction of the imaging optical devices closest to the light deflector is zero.

11. The light scanning unit of claim 1, wherein the two adjacent imaging optical devices are rotated around either a geometrical center or a vertex of an incident surface.

12. The light scanning unit of claim 1, wherein the imaging optical devices comprise f-.theta. lenses.

13. A light scanning unit, comprising:
a light source configured to emit a plurality of light beams;
a light deflector configured to deflection-scan the plurality of light beams; and
an imaging optical system forming images of the plurality of light beams deflection-scanned by the light deflector on scanned surfaces, the imaging optical system comprising at least two imaging optical devices in each light path of the plurality of light beams,
wherein imaging optical devices closest to the light deflector, among the at least two imaging optical devices disposed in each light path of the plurality of the light beams, are inclined with respect to the light deflector, and
wherein the imaging optical devices, which are respectively disposed on the light paths of two light beams deflection-reflected in opposite directions by the light deflector, and which are closest to the light deflector, are rotated in the same rotational direction around an axis extending along a main scanning.

14. The light scanning unit of claim 13, wherein the imaging optical devices closest to the light deflector are rotated by the same rotational angle.

15. The light scanning unit of claim 13, wherein refractive power in the sub-scanning direction of the imaging optical devices closest to the light deflector is zero.

16. A light scanning unit for scanning a light beam received from a light source onto and across a scanned surface, comprising:
a light deflector arranged in a light path of the light beam and configured to deflect the light beam received from the light source along a main scanning direction across the scanned surface, the light deflector having a reflective surface upon which the light beam received from the light source incident;
a first optical element arranged in the light path between the light deflector and the scanned surface, the first optical element having a first light incident surface upon which the light beam deflected by the light deflector is incident, the first light incident surface being inclined with respect to the light deflector such that the first light incident surface of the first optical element and the reflective surface of the light deflector are not parallel to each other; and
a second optical element arranged in the light path of the light beam between the light deflector and the scanned surface, the second optical element having a second light incident surface being inclined with respect to the light deflector to receive the light beam from the first optical element.

17. The light scanning unit of claim 16, wherein the second optical element is arranged in the light path of the light beam between the light deflector and the scanned surface downstream of the first optical element such that the light beam passing the first optical element is incident into the second light incident surface.

18. The light scanning unit of claim 17, wherein the first light incident surface and the second light incident surface being inclined by the same inclination angle.

19. The light scanning unit of claim 17, wherein the first light incident surface and the second light incident surface being inclined with the same inclination direction.

* * * * *